UNITED STATES PATENT OFFICE.

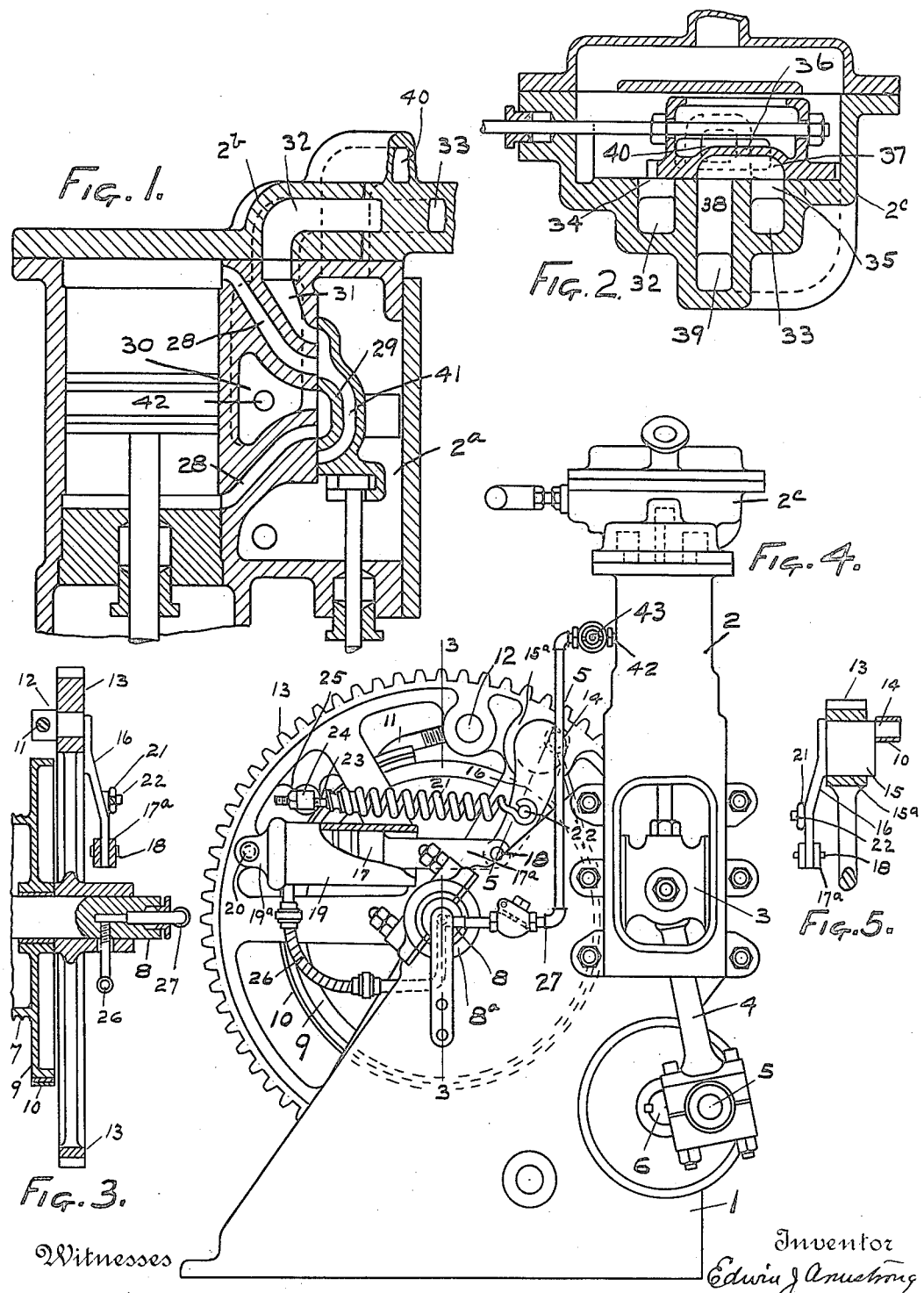

EDWIN J. ARMSTRONG, OF ERIE, PENNSYLVANIA, ASSIGNOR TO BALL ENGINE COMPANY, OF ERIE, PENNSYLVANIA, A CORPORATION OF PENNSYLVANIA.

ENGINE AND CLUTCH CONTROL.

1,165,831.   Specification of Letters Patent.   Patented Dec. 28, 1915.

Application filed January 20, 1915. Serial No. 3,372.

*To all whom it may concern:*

Be it known that I, EDWIN J. ARMSTRONG, a citizen of the United States, residing at Erie, in the county of Erie and State of Pennsylvania, have invented new and useful Improvements in Engine and Clutch Controls, of which the following is a specification.

This invention relates to engine and clutch controls and consists in certain improvements in the construction thereof as will be hereinafter fully described and pointed out in the claims.

With some engines used in connection with clutches it is desirable to simplify the control so that the clutch will be set or released as the engine is started or stopped. This is particularly true with hoisting engines and especially with hoisting engines used in connection with steam shovels. Here the operator has a number of controls to handle so that the simplification of any part of the mechanism is of great importance.

The present invention is exemplified as applied to a steam shovel engine.

The invention is illustrated in the accompanying drawings as follows:—

Figure 1 shows a central section through the engine and steam chest. Fig. 2 a central section through the controlling valve chest. Fig. 3 a section on the line 3—3 in Fig. 4. Fig. 4 a side elevation of a hoisting engine. Fig. 5 a section on the line 5—5 in Fig. 4.

1 marks the engine frame, 2 the engine cylinder, 3 the cross head, 4 the connecting rod, 5 the crank, and 6 the crank shaft.

The hoisting drum 7 is mounted on a shaft 8. The shaft 8 is carried by bearings 8ª in the engine frame. A friction wheel 9 is mounted on the drum. A friction band 10 operates on the friction wheel. The friction band is anchored by means of a bolt 11 which extends through the pin 12. The pin 12 is carried by the gear 13. The opposite end of the friction band is secured to a pin 14. The pin 14 is eccentrically mounted on the shaft 15. The shaft 15 is journaled in a bearing 15ª in the gear 13. A lever 16 is fixed on the shaft 15. The lever is connected with the piston 17 through an extension 17ª, the direct connection being effected through a pin 18 passing through the extension 17ª on the lever 16. The piston is arranged in the cylinder 19. The cylinder is pivotally mounted on the gear 13 by means of a pin 20, the pin extending through the ear 19ª on the cylinder. A spring 21 is secured to the lever 16 by means of a pin 22. A bolt 23 extends from the spring through the ear 24 on the gear 13. A nut 25 is arranged on the bolt 24 by means of which the spring is secured and may be adjusted. A steam pipe 26 leads to the cylinder 19. It is connected with an opening arranged axially in the shaft 8 (see dotted lines Fig. 4) and is connected at the axis with a pipe 27 leading to the steam supply for the engine.

It will be observed that when steam is turned into the cylinder 19, the piston is forced outwardly swinging the lever 16 thus tightening the friction band 10 on the friction wheel 9 and setting the clutch. When the pressure on the piston is relieved through the exhaust of steam, the spring 21 returns the rock lever 16 and thus relieves the pressure on the band 10 and releases the clutch.

Ports 28—28 lead from the cylinder to the steam chest 2ª of the engine. Steam is delivered and exhausted from the steam chest through the steam passages 30 and 31. By reversing the direction of steam through these passages the engine may be reversed. An engine valve 29 operates over these passages and ports. The passages 30 and 31 communicate with the passages 32 and 33 in a passage plate 2ᵇ which is secured to the end of the steam chest. The passages 32 and 33 terminate in the ports 34 and 35 leading into the controlling valve chest 2ᶜ. The valve 36 is arranged in the chest and operates over the ports 34 and 35. It is provided with a valve port 37 which is adapted to couple either the port 34 or 35 with an exhaust port 38, the exhaust port leading to the exhaust passage 39. Steam enters one or the other of the ports 34 or 35 as it is uncovered by the valve 36. As shown the port 32 is open and in this position the engine will be driven forward. With the valve in this position steam is exhausting by way of the passages 31, 33 and port 35. In order to maintain the valve 29 on its seat a third passage 40 extends from the controlling valve chest 2ᶜ to the steam chest 2ª. It will be observed that the valve 29 has a port passage 41 which is adapted to couple either of the ports 28 with the passage 31, thus operating for the exhaust when the engine is running in one direction and for the steam when running in the opposite direction. This construction of the valve 29 is a common one.

As heretofore stated, it is of advantage to have the control of the engine and the setting of the clutch on the hoisting drum effected with a single control. I accomplish this by connecting the pipe 27 with the passage 30, the passage 30 having the opening 42 leading to the pipe 27. With this construction when steam is turned into the engine, the engine running in the hoisting direction, steam is also turned into the cylinder 19 thus setting the clutch. Again when the engine is shut down by bringing the valve 36 to neutral steam is exhausted from the cylinder 19 by way of the passages 30, 32 and 34 and exhaust passage 38. It is often desirable in the hoisting operation especially in steam shovels to retard the movement of the drum through the action of the engine. This is accomplished by maintaining the clutch in set position and wire drawing the exhaust from the engine. With the present construction this is accomplished because where the exhaust is restricted through the controlling valve 36 a back pressure is created in the steam passage with which the pipe is connected and this back pressure which retards the engine is ample to retain the clutch in set position with the load it has under these conditions. Where the engine is used only for hoisting the reversing feature is unnecessary and it is then possible to make a connection with the steam line between the controlling valve and the engine. It is desirable when the engine is used for a purpose requiring reversal to shut off the steam from the cylinder 19. This is accomplished by the valve 43.

What I claim as new is:—

1. In an engine and clutch control, the combination of an engine; devices for supplying steam to the engine comprising a controlling valve controlling the inlet and exhaust steam from the engine and a steam passage from the valve to the engine; a clutch; steam actuated means for actuating the clutch; and a connection between said steam passage and said means.

2. In an engine and clutch control, the combination of an engine; devices for supplying steam to the engine comprising a controlling and reversing valve controlling the movement of steam to and from the engine and steam passages from the valve to the engine; a clutch; steam actuated means for actuating the clutch; and a connection between one of the steam passages and said means.

3. In an engine and clutch control, the combination of an engine; devices for supplying steam to the engine comprising a controlling and reversing valve controlling the movement of steam to and from the engine and steam passages from the valve to the engine; a clutch; steam actuated means for actuating the clutch; a connection between one of the steam passages and said means; and a valve for cutting off said connections.

In testimony whereof I have hereunto set my hand in the presence of two subscribing witnesses.

EDWIN J. ARMSTRONG.

Witnesses:
V. C. HESS,
B. M. HARTMAN.